US010372104B2

(12) United States Patent
Case et al.

(10) Patent No.: US 10,372,104 B2
(45) Date of Patent: Aug. 6, 2019

(54) INDUSTRIAL AUTOMATION CONTROL SYSTEM CONTENT PROTECTION

(71) Applicant: Rockwell Automation Technologies, Inc., Mayfield Heights, OH (US)

(72) Inventors: Clark Case, Aurora, CO (US); Taryl Jasper, South Euclid, OH (US); Michael Bush, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 265 days.

(21) Appl. No.: 15/052,862

(22) Filed: Feb. 24, 2016

(65) Prior Publication Data
US 2016/0252895 A1  Sep. 1, 2016

Related U.S. Application Data

(60) Provisional application No. 62/126,008, filed on Feb. 27, 2015.

(51) Int. Cl.
*G05B 19/406* (2006.01)
*G05B 15/00* (2006.01)
(Continued)

(52) U.S. Cl.
CPC ........... *G05B 19/406* (2013.01); *G05B 15/00* (2013.01); *G05B 19/418* (2013.01); *G06F 21/105* (2013.01); *G06F 21/12* (2013.01); *G06Q 30/01* (2013.01); *G06Q 30/018* (2013.01); *G06Q 30/0185* (2013.01); *G06Q 50/04* (2013.01);
(Continued)

(58) Field of Classification Search
CPC .............................. G05B 19/406; G05B 19/418
See application file for complete search history.

(56) References Cited

U.S. PATENT DOCUMENTS 5,752,041 A     5/1998  Fosdick
2003/0125975 A1  7/2003  Danz et al.
(Continued)

FOREIGN PATENT DOCUMENTS

DE      19824814 A1   12/1999

OTHER PUBLICATIONS

Stamas, "Drives and Controls Product Release—Automation Builder 1.2 with new License options", US Sales Information, Feb. 15, 2016, 3 pages.*

*Primary Examiner* — Thomas L Dickey

(57) ABSTRACT

Techniques to facilitate protection of control system content used in an industrial automation environment are disclosed herein. In at least one implementation, the control system content for use in the industrial automation environment is received, wherein the control system content comprises controller program code that directs an industrial controller to drive a machine system. Content protection instructions for the control system content are also received, wherein the content protection instructions comprise restrictions on execution of the control system content. An execution license that includes process-related constraints for the control system content is generated based on the content protection instructions. The execution license is applied to the control system content to generate protected content, wherein use of the control system content is granted subject to the process-related constraints of the execution license.

10 Claims, 6 Drawing Sheets

(51) Int. Cl.
  *G05B 19/418* (2006.01)
  *G06F 21/10* (2013.01)
  *G06F 21/12* (2013.01)
  *G06Q 30/00* (2012.01)
  *G06Q 50/04* (2012.01)
  *G06Q 50/18* (2012.01)

(52) U.S. Cl.
  CPC . *G06Q 50/184* (2013.01); *G05B 2219/36546* (2013.01); *G06F 2221/2141* (2013.01); *Y02P 90/30* (2015.11)

(56) References Cited

U.S. PATENT DOCUMENTS

| | | | |
|---|---|---|---|
| 2003/0188157 A1 | 10/2003 | Birzer et al. | |
| 2007/0124251 A1* | 5/2007 | Shimizu | G06F 21/10 705/59 |
| 2008/0225337 A1* | 9/2008 | Yano | G06F 21/10 358/1.16 |
| 2009/0282146 A1* | 11/2009 | Nakano | G06F 21/105 709/224 |
| 2015/0081047 A1* | 3/2015 | Kubota | G05B 15/02 700/40 |
| 2016/0011573 A1* | 1/2016 | Marti | G05B 15/02 700/9 |
| 2016/0073217 A1* | 3/2016 | Schmedling | H04W 4/008 726/29 |
| 2016/0162667 A1* | 6/2016 | Komatsu | G06F 21/105 726/7 |
| 2016/0171186 A1* | 6/2016 | Marking | H04L 9/0861 713/190 |

* cited by examiner

INDUSTRIAL AUTOMATION CONTROL SYSTEM CONTENT PROTECTION

RELATED APPLICATIONS

This application claims the benefit of, and priority to, U.S. Provisional Patent Application No. 62/126,008, entitled "LICENSING THE VISIBILITY, EXECUTION, OR USE OF CONTENT IN A CONTROL SYSTEM FOR INDUSTRIAL AUTOMATION", filed Feb. 27, 2015, which is hereby incorporated by reference in its entirety for all purposes.

TECHNICAL FIELD

Aspects of the disclosure are related to computing hardware and software technology, and in particular to industrial automation applications.

TECHNICAL BACKGROUND

Industrial automation environments utilize machines during the industrial manufacturing process, such as drives, pumps, motors, and robots. These machines typically have various moving parts and other components that are driven by instructions received from industrial controller systems. Machine builders and Solution Providers typically produce the control logic needed to run on these controllers to control the machines.

In addition to controller logic, other content may be employed or generated during industrial automation operations, such as data sets, drive parameters, cam tables, product formulations, recipes, production data, and human-machine interface (HMI) components. An HMI receives and processes status data from the machines to generate various graphical displays. For example, an HMI graphical display might indicate status metrics of a drive, the pressure of a pump, the speed of a motor, or the output of a robot. The HMI may also provide a mechanism for an operator to send control instructions to an industrial controller system that controls a machine. For example, an operator might use the HMI to direct the control system to update drive parameters, turn on a pump, speed-up a motor, or stop a robot.

OVERVIEW

Provided herein are systems, methods, and software to facilitate protection of control system content used in an industrial automation environment. In at least one implementation, the control system content for use in the industrial automation environment is received, wherein the control system content comprises controller program code that directs an industrial controller to drive a machine system. Content protection instructions for the control system content are also received, wherein the content protection instructions comprise restrictions on execution of the control system content. An execution license that includes process-related constraints for the control system content is generated based on the content protection instructions. The execution license is applied to the control system content to generate protected content, wherein use of the control system content is granted subject to the process-related constraints of the execution license.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for digital rights management of intellectual property related to industrial automation. For example, integrated architecture control systems can be utilized by solution providers or system integrators to produce machine logic, configuration data, routines, and add-on instructions (MHO used to program logic controllers that control the operation of machines, and such control logic should be protected from viewing or editing by unauthorized parties. In addition, copy protection that provides restrictions on the use of such control logic can also be applied, such as limiting the number and/or type of controllers that can be run from the control instructions. Proprietary manufacturing data also requires protection from viewing, editing, and execution by unauthorized parties, such as data sets, product formulations, and recipes that are used to produce commercial goods, such as tires, shoes, beer, or any other commercial products, including any resulting production data. Finally, human-machine interface (HMI) content, such as HMI displays, faceplates, and other objects may be protected from reverse engineering, overuse, and any other unauthorized or undesired usage.

Figure 1:
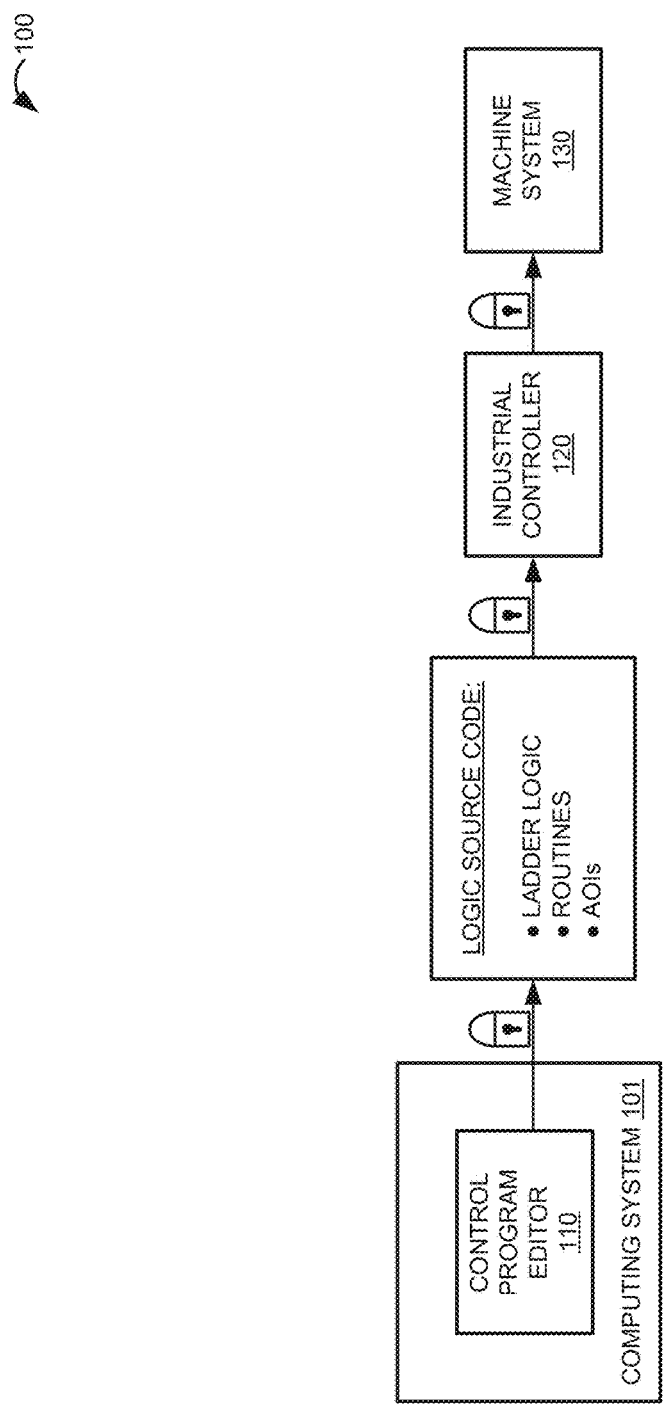
FIG. 1 is a block diagram that illustrates an industrial automation environment in an exemplary implementation.
Figure 2:
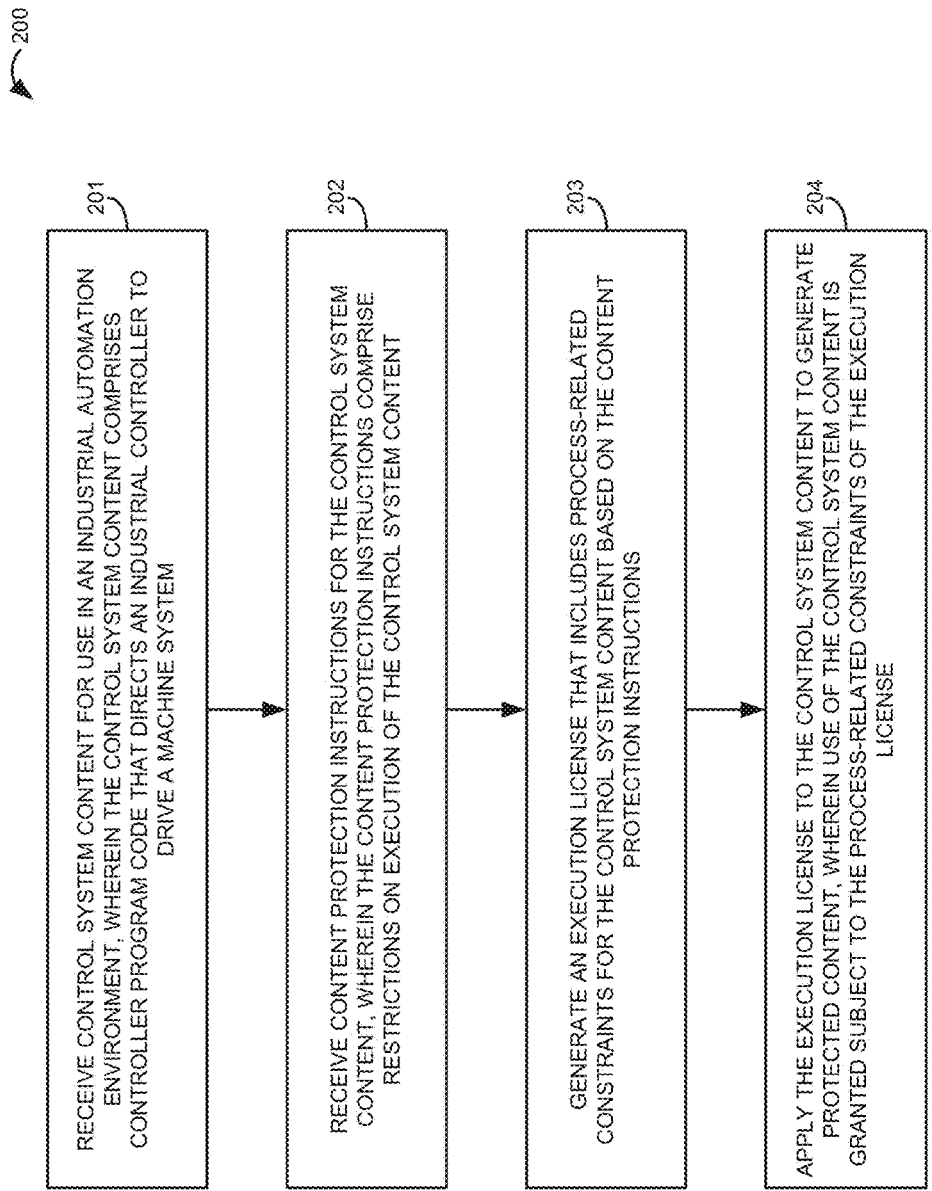
FIG. 2 is a flow diagram that illustrates an operation of a computing system in an exemplary implementation.
Figure 3:
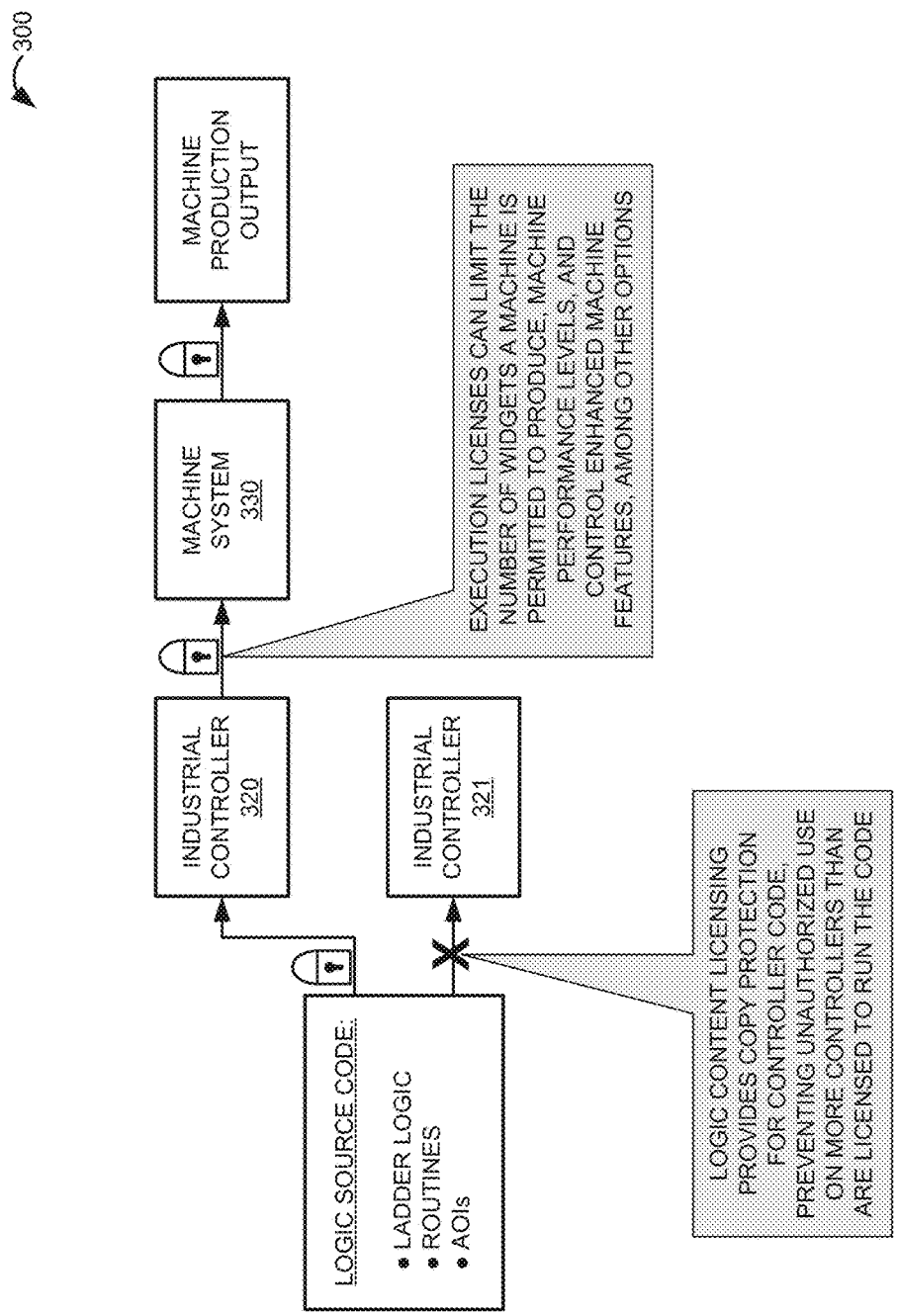
FIG. 3 is a block diagram that illustrates an industrial automation environment and an operational scenario of run-time protection of controller logic content in an exemplary implementation.
Figure 4:
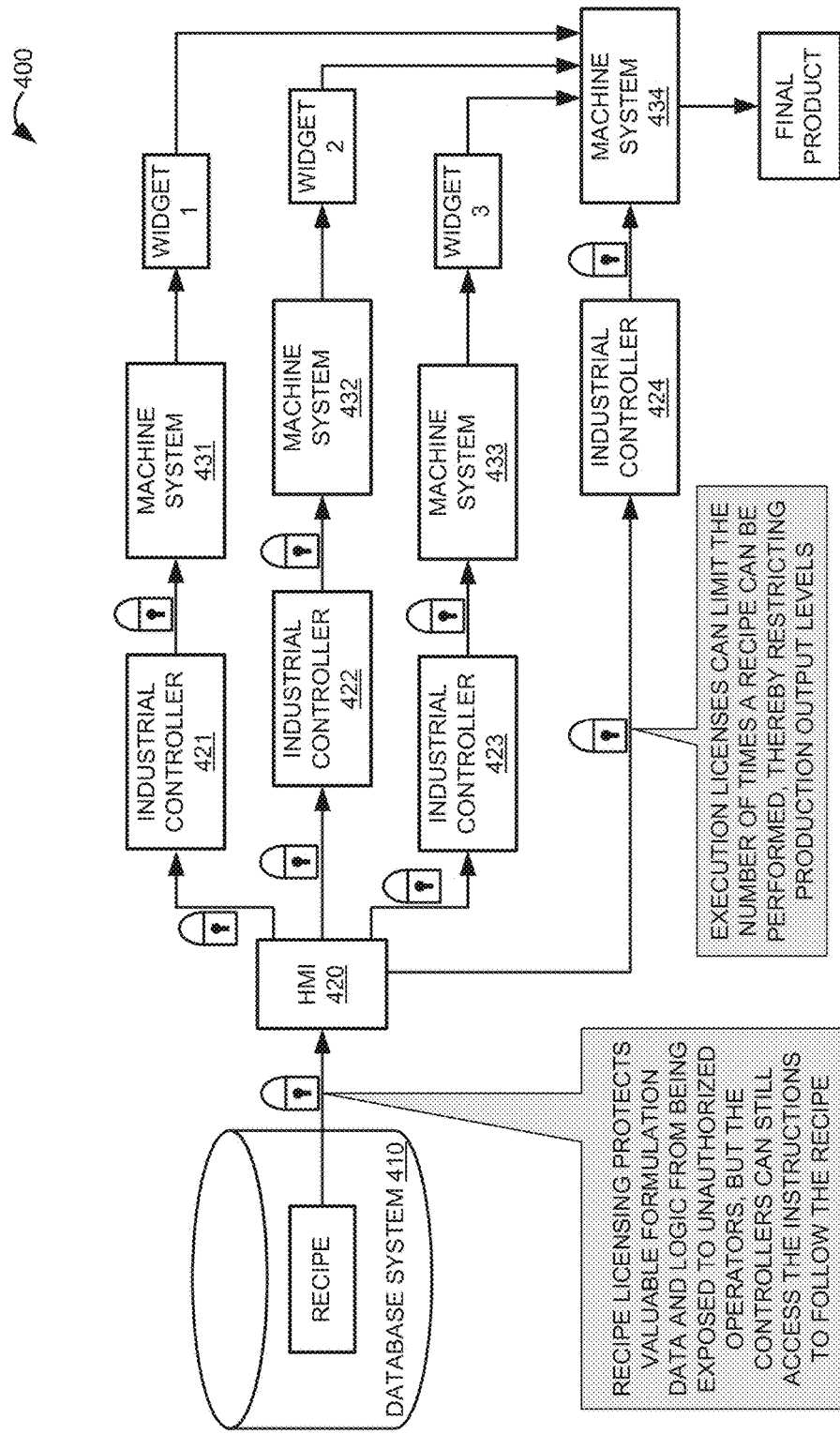
FIG. 4 is a block diagram that illustrates an industrial automation environment and an operational scenario that describes run-time protection and execution licensing for recipes in an exemplary implementation.
Figure 5:
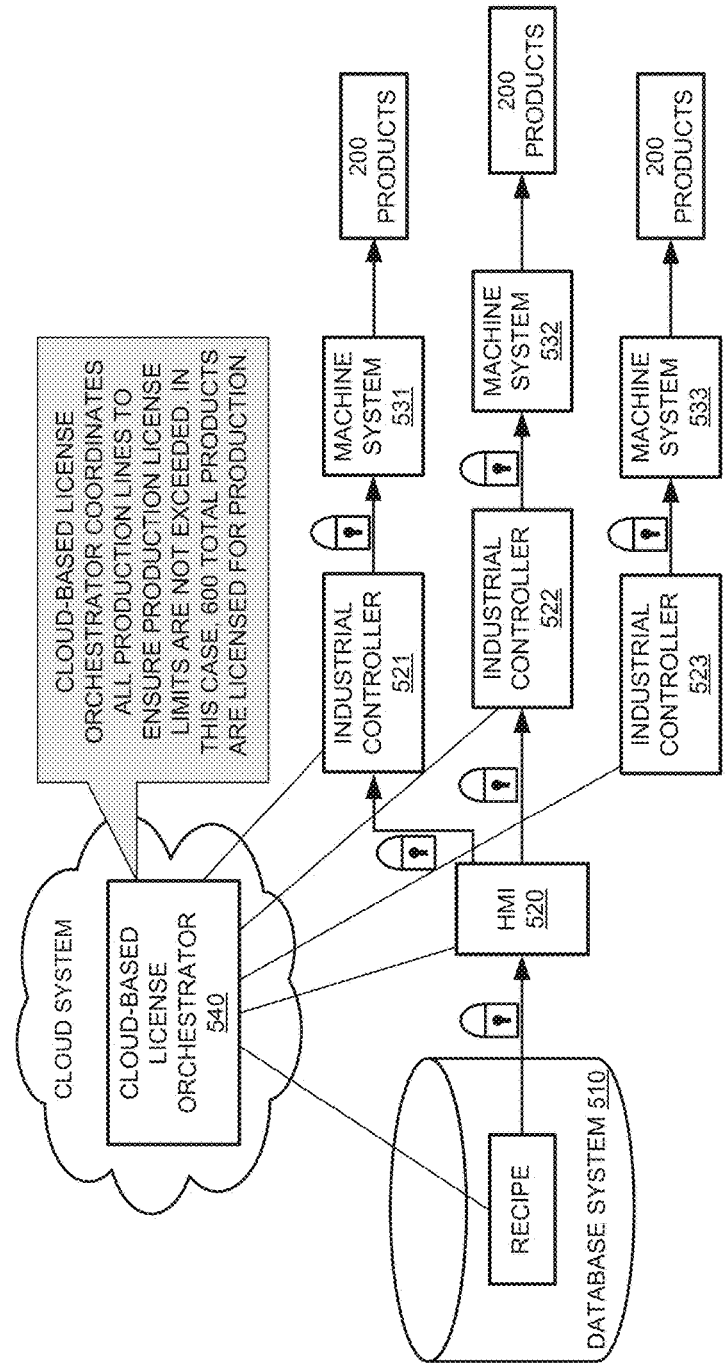
FIG. 5 is a block diagram that illustrates an industrial automation environment and an operational scenario involving a cloud-based license orchestrator to ensure production license limits are enforced over multiple production lines in an exemplary implementation.
Figure 6:
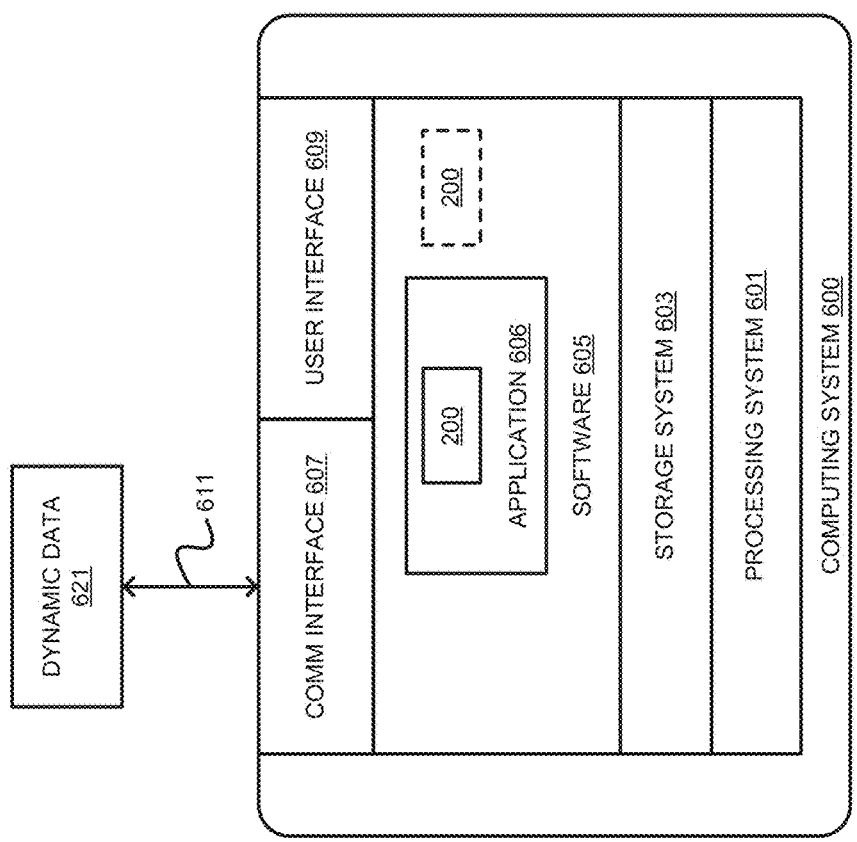
FIG. 6 is a block diagram that illustrates a computing system in an exemplary implementation.

Referring now to the drawings, FIG. 1 illustrates an exemplary industrial automation environment, and FIG. 2 illustrates a flow diagram that describes an operation to facilitate protection of control system content used in an industrial automation environment. FIG. 3 illustrates an exemplary industrial automation environment that shows examples of run-time protection of controller logic content. FIG. 4 illustrates an exemplary industrial automation environment describing run-time protection and execution licensing for recipes. FIG. 5 illustrates an exemplary industrial automation environment involving a cloud-based license orchestrator to ensure production license limits are enforced over multiple production lines. FIG. 6 illustrates an exemplary computing system that may be used to perform any of the processes and operational scenarios described herein.

Turning now to FIG. 1, a block diagram that illustrates industrial automation environment 100 in an exemplary implementation is shown. Industrial automation environment 100 includes computing system 101, industrial controller 120, and machine system 130. Industrial controller 120 and machine system 130 are in communication over a communication link. Computing system 101 is shown running control program editor 110. In some examples, control program editor 110 could comprise an RSLogix™ system or a Studio 5000® environment provided by Rockwell Automation, Inc. Note that there would typically be many more machine systems in most industrial automation environments, but the number of machine systems shown in FIG. 1 has been restricted for clarity.

Industrial automation environment 100 comprises an automobile manufacturing factory, food processing plant, oil drilling operation, microprocessor fabrication facility, or some other type of industrial enterprise. Machine system 130 could comprise a sensor, drive, pump, filter, drill, motor, robot, fabrication machinery, mill, printer, or any other industrial automation equipment. Additionally, machine system 130 could comprise other industrial assets, such as a brew kettle in a brewery, a reserve of coal or other resources, or any other element that may reside in an industrial automation environment 100. Industrial controller 120 comprises a control system that drives the operation of machine system 130, which could include automation controllers, programmable logic controllers (PLCs), or any other controllers used in automation control. In some examples, industrial controller 120 could comprise a ControlLogix® control system provided by Rockwell Automation, Inc.

The controller program code produced by control program editor 110 provides control instructions that may be processed by industrial controller 120 to control the operation of machine system 130. Controller program code includes ladder logic, routines, and add-on instructions (AOIs), among other source data. AOIs provide the ability to design more modular code by creating simpler instructions that can be used to build more complex functionality by nesting instructions.

Original Equipment Manufacturers (OEMs), Solution Providers, system integrators, and other designers typically generate controller program code using control program editor 110. OEMs typically design and/or build machines, along with their associated control instructions. Solution Providers or system integrators often develop products but do not necessarily build or sell machines or equipment. Instead, Solution Providers typically design controller logic code to program systems to solve industrial problems. For example, a Solution Provider could use control program editor 110 to produce ladder logic that instructs industrial controller 120 to drive machine system 130 to create maple syrup from sap in a new and more efficient way than the industry-standard technique. OEMs, Solution Providers, and other designers and creators of control system content have an interest in protecting their controller program code, device settings, configuration data, values, and other proprietary content from being viewed and edited by unauthorized third parties.

As shown by the lock icons appearing in FIG. 1, protection can be applied to control system content to secure controller logic source code and other data from unlicensed use, including unauthorized viewing, editing, and execution. Control system content protection may provide both design-time control of access to view or edit the control system content and run-time control over the execution of the control system content. In some examples, this protection may be applied to the control system content by control program editor 110 or any other software, device, or system, including HMI systems, industrial controller 120, and other industrial automation equipment. An exemplary operation of computing system 101 to facilitate protection of control system content will now be discussed with respect to FIG. 2.

FIG. 2 is a flow diagram that illustrates an operation 200 of computing system 101 in an exemplary implementation. The operation 200 shown in FIG. 2 may also be referred to as content protection process 200 herein. The steps of the operation are indicated below parenthetically. The following discussion of operation 200 will proceed with reference to computing system 101 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system facilitate protection of control system content used in an industrial automation environment. In some examples, operation 200 may be performed by control program editor 110, although operation 200 could be execute by any computing system 101, including systems which do not have control program editor 110 installed thereon. As shown in the operational flow of process 200, computing system 101 receives the control system content for use in the industrial automation environment, wherein the control system content comprises controller program code that directs industrial controller 120 to drive machine system 130 (201). The control system content typically comprises user-defined data for configuring and/or operating an industrial automation device. For example, the control system content could comprise any data associated with the operation of a configurable industrial automation device, such as industrial controller 120 and/or machine system 130, HMI systems, drives, or any other industrial automation device that may be configured by a user. In some examples, the control system content could comprise controller program code, device settings, machine features, configuration data, HMI content, production data, formulation data, drive configuration data, cam tables, product formulations and recipes, data sets, values, and any other content associated with the operation of an industrial automation device. The control system content could be received by computing system 101 in a variety of ways. In some examples, control system content could be received by computing system 101 from a user operating control program editor 110 to generate the control system content. Additionally, the control system content could be received by computing system 101 from a user or another system entering, copying, installing, inputting, or otherwise providing the control system content to computing system 101. The control system content could also be received by computing system 101 over a network from a remote system in some examples. In this example, the control system content comprises controller program code that directs industrial controller 120 to drive machine system 130.

Computing system 101 receives content protection instructions for the control system content, wherein the content protection instructions comprise restrictions on execution of the control system content (202). The content protection instructions could be received by computing system 101 from various sources. In some examples, the content protection instructions could be received by computing system 101 from a user operating control program editor 110 to specify the content protection instructions for the control system content. The content protection instructions could also be received by computing system 101 from a user or another system inputting, copying, or otherwise providing the content protection instructions to computing system 101. The content protection instructions could also be received by computing system 101 over a network from a remote system in some examples. In this example, the content protection instructions comprise restrictions on execution of the control system content. The content protection instructions could also comprise licensing information for the control system content in some examples. For example, a user could purchase different software licenses to unlock various functionalities associated with the control system content, such as removing restrictions on execution of the control system content. In some examples, the content protection instructions could also comprise restrictions on access to the control system content, such as specifying limitations on the ability of users to view and/or edit the control system content using control program editor 110. Any other type of restrictions and/or permissions for the control system content may be specified in the content protection instructions and are within the scope of this disclosure.

Computing system 101 generates an execution license that includes process-related constraints for the control system content based on the content protection instructions (203). Typically, computing system 101 processes the content protection instructions to generate the execution license that may be applied to the control system content to implement the content protection instructions. In some examples, computing system 101 may also generate access restrictions for the control system content based on the content protection instructions, which may control the ability of users to view and/or edit the control system content. The process-related constraints included in the execution license generated by computing system 101 could comprise any limitations on usage of the control system content. For example, the process-related constraints of the execution license could comprise controller limits that restrict a number of controllers on which the control system content may be run, production limits that restrict a number of products that the control system content can be used to produce, performance limits that restrict a level of performance at which the control system content can be used to operate machine system 130, and any other limitations on the execution of the control system content.

Computing system 101 applies the execution license to the control system content to generate protected content, wherein use of the control system content is granted subject to the process-related constraints of the execution license (204). Typically, computing system 101 applies the execution license to the controller program code and other data of the control system content to implement the execution license. The control system content that is protected by the execution license applied thereto may then be referred to as protected content. In some examples, computing system 101 may apply the execution license to the control system content by applying the controller limits that prevent execution of the control system content on more controllers than the number of controllers on which the control system content may be run. Computing system 101 may also apply the execution license to the control system content by applying the production limits that prevent execution of the control system content after the number of products that the control system content can be used to produce has been met. Further, computing system 101 may apply the execution license to the control system content by applying the performance limits that prevent execution of the control system content to operate machine system 130 at a higher level of performance than the level of performance at which the control system content can be used to operate machine system 130. In some examples, computing system 101 may also apply access restrictions to the control system content to generate the protected content, wherein unauthorized access to the control system content is prevented based on the access restrictions. For example, control system content protected by the access restrictions could control the ability of users to view and/or edit the control system content, such as by using control program editor 110. Other access restrictions and execution licenses, including those mentioned in other sections herein, may be applied to the control system content by computing system 101 to generate the protected content.

Advantageously, by applying the execution license to the control system content, computing system 101 generates protected content that grants use of the control system content subject to the process-related constraints of the execution license. By protecting the control system content, the techniques described herein provide the technical advantage of electronically safeguarding proprietary data from unlicensed access, execution, and any other use. Further, by eliminating unauthorized requests to access and use the control system content, the load on the processors, mechanical components, and other elements of an industrial automation environment may be reduced, resulting in significant energy savings by avoiding unnecessary operations. In this manner, owners of the control system content can better protect and manage their digital rights over the content they produce.

As discussed above, control system content protection may provide both design-time control of access to view or edit the control system content and run-time control over the execution of the control system content. Control system content protection can apply access restrictions to implement password-based design-time control of access to ladder logic, routines, AOIs, and any other controller program code. Access restrictions provide content owners with control which users and/or groups of users are authorized to view, edit, copy, and export objects, among other operations. In some implementations, access to viewing and/or editing control system content can be time-limited for certain users or user groups.

Access restrictions can also be defined for control system content that control which users are authorized to view and/or edit the control system content. In some implementations, to implement the access restrictions, a security authority can be assigned to a particular piece of equipment, such as a Lightweight Directory Access Protocol (LDAP) server known as LDAP1. A security description can also be assigned to a particular data item of control system content, such as permitting the user group "FieldEngineers" of LDAP1 to have full read/write access. Instead of a full security authority, a simple security authority could also be used that can evaluate simple security assertions like password knowledge. For example, a security descriptor using a simple security authority could be defined by providing read-only access to users who enter a certain password. Systems for transporting user information about a particular user in a secure way could be employed, such as an encrypted file that tells the system to consider the bearer of the file to be a "FieldEngineer" of LDAP1 for a specified amount of time. The system would accept these encrypted access credentials, and is capable of evaluating security descriptors against external security authorities, the simple security authority, and any access credentials that may be presented. In this manner, the intellectual property that is contained within control system content can be protected, whether the owner of the source content is a sophisticated end-user with a complex authentication and authorization system, or a one-person Solution Provider that just wants to apply a password to a certain routine. Some examples of how unauthorized execution of the control system content can be prevented will now be discussed with respect to FIGS. 3 through 5.

FIG. 3 is a block diagram that illustrates industrial automation environment 300 in an exemplary implementation. The techniques described in FIG. 3 could be executed by computing system 101 and other elements of industrial automation environment 100, and could also be combined with operation 200 of FIG. 2 in some implementations. Industrial automation environment 300 includes industrial controllers 320 and 321 and machine system 330. Note that there would typically be many more machine systems in most industrial automation environments, but the number of machine systems shown in FIG. 3 has been restricted for clarity.

FIG. 3 provides examples of run-time protection for controlling the usage of the control system content, as opposed to design-time protection which controls access to view and edit the controller program code and other content. In this example, the control system content comprises controller logic source code. The owner of the controller logic source code has placed limitations on the usage of the code by applying execution license in the form of controller limits. In particular, the logic content owner has only licensed the code for use on a single industrial controller 320. The code is provided to industrial controller 320 in a protected format that does not allow the user of the code to view or edit the contents, as indicated by the lock icon, but industrial controller 320 can access the code to run it in order to drive machine system 330 to produce an output. However, when the user of the logic source code attempts to run the code on a second industrial controller 321 which is unlicensed, the code will not work to operate industrial controller 321, as shown by the large "X" appearing in FIG. 3. In this manner, control system content licensing provides for copy protection for controller code, thereby preventing unauthorized use on more controllers than are licensed to run the code.

In another example, the owner of the controller logic source code has also licensed the code for a limited production level by applying an execution license in the form of production limits. Thus, when the user runs the code on the licensed and authorized industrial controller 320, machine system 330 is limited by the license to only output a specified number of products. If the user desires to produce more of the product, the user would have to purchase an additional execution license from the controller logic source code owner. Execution licenses can limit the number of widgets a machine is permitted to produce, performance levels of a machine, and provide control over enhanced machine features, among other options. For example, machine system 330 may be capable of operating at different speeds using the control logic provided by the owner, and the end-user would need to purchase a particular license to run machine system 330 at the faster speeds. In another example, an enhanced machine feature for a machine that produces widgets is that the machine could also be capable of boxing the widgets, but this functionality could be disabled by default unless the user purchases a special license to unlock this feature. These types of execution licenses can also be made to expire on a certain date, or after a certain time period has elapsed. Such licenses also enable capabilities like demonstration periods for machines and solutions, disabling machines and solutions if contractual terms are not upheld or licenses are not renewed, and others. In some examples, the details of these licenses could be included in the content protection instructions for the control system content that is received by computing system 101 during content protection process 200. In such cases, computing system 101 could generate the execution license for the control system content based on the licensing information received in the content protection instructions, and enforce the provisions of those licenses by applying the execution license to the control system content to generate the protected content.

Execution licenses can be created for any type of control system content. For example, licenses can be utilized for content including human-machine interface (HMI) screens, formulation sets, or a module of controller logic. As discussed above, such execution licenses could grant unrestricted use, allow use for a specified period of time, grant a certain number of uses, or any other limitations on use. Licenses could be made available for checking in a secure manner. For example, a secure digital (SD) memory card in an industrial controller could be used to check license information for control system content. In another example, a license server in the control system could check for valid licenses prior to authorizing use of control system content. The licensed content itself is also configured to check for required licenses prior to allowing execution. Such behavior and ability could be included in the protected content generated by computing system 101 during content protection process 200.

Control system content may also include industrial controller programs, equipment phases, and sequences which can also be protected. The system provides a larger, protectable container for more complicated system objects. In addition, the control system content can also include tags within a program, along with static controller resident data like formulation sets, cam tables, drive parameters, and other data, all of which may be protected using the techniques described herein.

Advantageously, new business models for OEM machine builders and Solution Providers are possible through the run-time protection of control system content provided by execution licenses. For example, machines can be leased on a per-unit-produced basis. In addition, the same machine may be sold at different performance levels, and can be upgraded remotely through the sale of additional licenses. OEMs and Solution Providers can also monetize industryspecific solutions with less concern of overuse or exposure of proprietary data to competitors, providing a great benefit to these content owners.

Turning now to FIG. 4, an exemplary industrial automation environment 400 is shown which describes an example of run-time protection and execution licensing for recipes. The techniques described in FIG. 4 could be executed by computing system 101 and other elements of industrial automation environment 100, and could also be combined with operation 200 of FIG. 2 in some implementations. Recipes include formulation data and logic that define processes involving the interaction of many machines and equipment to make a particular product. In some examples, recipes can be used with a system running FactoryTalk® Batch provided by Rockwell Automation, Inc. Recipe licensing protects secret recipe details from being exposed, and also facilitates expansion of contract manufacturing in process industries, particularly in countries with insufficient legal controls over the use of intellectual property.

Industrial automation environment 400 includes database system 410, human-machine interface (HMI) 420, industrial controllers 421, 422, 423, and 424, and machine systems 431, 432, 433, and 434. Machine systems 431-434 continually produce operational data over time. The operational data indicates the current status of the machine systems, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine systems 431-434 and/or controllers 421-424 are capable of transferring the operational data over a communication link to database system 410, HMI 420, an application integration platform, or any other type of computing system, typically via a communication network. Database system 410 could comprise a disk, tape, integrated circuit, server, or some other memory device. Database system 410 may reside in a single device or may be distributed among multiple memory devices.

In this example, an operator pulls a recipe from database system 410 to HMI 420 to create a batch of products according to the recipe. As shown by the lock icon appearing on FIG. 4, the operator cannot see the details of the recipe or see how the product is made, but the industrial controllers 421-424 can access the formulation data variable and value sets and the control logic instructions to carry out the recipe. Recipe licensing thus protects this valuable formulation data and logic from being exposed to unauthorized operators and other persons, but still enables execution of the recipe.

The recipe in this example directs controllers 421, 422, and 423 to drive their respective machine systems 431, 432, and 433 to produce widgets 1, 2, and 3. Each of these three widgets is then provided to machine system 434 which is driven by controller 424 to combine the widgets to produce the final product. Execution licenses can limit the number of times a recipe can be performed, thereby restricting production output levels. Advantageously, this protection allows for contracting outsourced manufacturing from foreign countries without concern that the recipe will be stolen or additional products will be produced with the recipe beyond the contract terms.

Turning now to FIG. 5, an exemplary industrial automation environment 500 is illustrated. The techniques described in FIG. 3 could be executed by computing system 101 and other elements of industrial automation environment 100, and could also be combined with operation 200 of FIG. 2 in some implementations. Industrial automation environment 500 includes a cloud-based license orchestrator 540 to ensure production license limits are enforced over multiple production lines. Industrial automation environment 500 includes database system 510, HMI 520, industrial controllers 521, 522, and 523, machine systems 531, 532, and 533, and cloud-based license orchestrator 540. Note that in some examples, industrial controllers 521, 522, and 523 and their respective machine systems 531, 532, and 533 could be located in geographically diverse locations.

In this example, there are three production lines running in parallel processing a recipe to produce the same product more quickly. However, only 600 total products are licensed for production from the recipe. The cloud-based license orchestrator 540 coordinates all production lines to ensure the production license limits are not exceeded. In this case, 600 total products are licensed for production, and each machine system 531, 532, and 533 accordingly produces only 200 copies of the product. The cloud system could also enable the recipe owner to view the progress of the recipe usage from afar, to see how much of the product has been produced and how much of the license remains.

In addition to protecting recipes and formulation data, production data can also be protected through the use of security and licensing. Production data is the data that results from producing a product. For example, the system can protect data that moves between different computing systems in an automation environment, where some of that data may represent how a product is made and some may represent production data that results from producing that product. In some implementations, a formulation set may be defined in such a way that the interface, which describes the data that the formulation set contains, is separate from the formulation values themselves. A security authority and a security descriptor can be defined that are associated with the formulation set. The security descriptor can define attributes of the users and the other control system components that are permitted to access the formulation set. HMI systems and other software applications can then grant or deny users access to formulation sets. Other control system components can request and receive access to a formulation set, such as a material addition component ha needs to know how much of a certain material to add. The production data derived from a formulation set can also be stored securely, thereby protecting access to that production data. This system therefore beneficially protects the formulation throughout its entire usage cycle, from definition, to use, to storage with production data. In addition, control system components are enabled to make security claims on one another. For example, a control module can request access to a formulation set, and must provide credentials or authorization to prove that it is trusted to use the formulation set.

In addition to formulation sets, data sets can also be protected. A data set is a collection of named data values. These values may represent setpoints for making a particular product, drive parameters, or cam tables for a particular mode of operation of a machine. A cam table helps define the motion of a machine, such as when one component of a machine moves in a certain way another component will responsively move in a corresponding way. Data sets often move around, such as from engineering workstations to HMIs to controllers to complex devices like drives. Data set licensing allows machine builders more flexibility in the protection of intellectual property in their machines. In addition, data set licensing enables further use of contract manufacturing with decreased risk of over-production for black market use and counterfeiting by competitors or unscrupulous manufacturing plants.

Finally, the system provides for protection of HMI content through licensing. For example, HMI content such as HMI displays, screens, faceplates, and other objects can be protected from reverse-engineering and overuse. A faceplate is a subcomponent in an HMI display, typically a reusable graphic composed on an assembly of icons. HMI components can provide useful content protections for factory operations. Solution Providers and machine builders can monetize the content protection of a solution in addition to its execution. For example, HMI components can be licensed for a set number of terminals. In addition, customers can be charged based on functionality exposed, such as charging less for read-only faceplates than for fully-functional and editable faceplates.

The systems and techniques described above provide for improved protection and digital rights management of intellectual property related to industrial automation. Control logic can be protected from viewing or editing by unauthorized parties, and copy protection that provides restrictions on the use of such control logic can also be applied, such as limiting the number and/or type of controllers that can be run from the control instructions. Proprietary manufacturing data can also be protected from viewing, editing, and execution by unauthorized parties, such as data sets, product formulations, and recipes that are used to produce commercial goods, including any resulting production data. Further, human-machine interface (HMI) content, such as HMI displays, faceplates, and other objects can be protected from reverse engineering, overuse, and any other unauthorized or undesired usage.

Turning now to FIG. 6, a block diagram is shown that illustrates computing system 600 in an exemplary implementation. Computing system 600 provides an example of computing system 101 or any system that may be used to perform any of the techniques disclosed herein or variations thereof, although such systems could use alternative configurations. Computing system 600 could also provide an example of an industrial controller or any control system that may be used to perform any of the techniques disclosed herein or variations thereof, although such systems could use alternative configurations. Computing system 600 includes processing system 601, storage system 603, software 605, communication interface 607, and user interface 609. Software 605 includes application 606 which itself includes content protection process 200. Content protection process 200 may optionally be implemented separately from application 606.

Computing system 600 may be representative of any computing apparatus, system, or systems on which application 606 and content protection process 200 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for computing system 101 for execution of content protection process 200 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer readable media or storage media readable by processing system 601 and capable of storing software 605. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 609, processing system 601 loads and executes portions of software 605, such as application 606 and/or content protection process 200, to facilitate protection of control system content used in an industrial automation environment, such as application 606, are executed on physical devices. When representative of computing system 101, software 605 may be implemented in program instructions and among other functions may, when executed by computing system 600 in general or processing system 601 in particular, direct computing system 600 or processing system 601 to receive the control system content for use in the industrial automation environment, wherein the control system content comprises controller program code that directs an industrial controller to drive a machine system, and receive content protection instructions for the control system content, wherein the content protection instructions comprise restrictions on execution of the control system content. Software 605 may further direct computing system 600 or processing system 601 to generate an execution license that include process-related constraints for the control system content based on the content protection instructions, and apply the execution license to the control system content to generate protected content, wherein use of the control system content is granted subject to the process-related constraints of the execution license.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate protection of control system content used in an industrial automation environment as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606, content protection process 200, and variations thereof. However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, keyboard, mouse, and other comparable input devices and associated processing elements capable of receiving user input from a user. Output devices such as a display, speakers, haptic devices, and other types of output devices may also be included in user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system, in an industrial automation environment, to facilitate protection of control system content used in the industrial automation environment, the method comprising:
    receiving, by one or more processors, the control system content for use in the industrial automation environment, wherein the control system content comprises controller program code that directs an industrial controller to drive a machine system;
    receiving, by the one or more processors, content protection instructions for the control system content, wherein the content protection instructions comprise restrictions on execution of the control system content;
    generating, via the one or more processors, an execution license that includes process-related constraints for the control system content based on the content protection instructions, wherein the process-related constraints of the execution license comprise production limits that restrict a total number of products that the control system content can be used to produce;
    applying the execution license to the control system content to generate protected content; and
    producing a number of products by the machine system via execution of the protected content by the control industrial controller to drive the machine system, wherein the number of products produced is limited by the total number of products specified by the process-related constraints.

2. The method of claim 1 wherein the process-related constraints of the execution license comprise controller limits that restrict a number of controllers on which the control system content may be run, and wherein applying the execution license to the control system content to generate the protected content comprises applying the controller limits that prevent execution of the control system content on more controllers than the number of controllers on which the control system content may be run.

3. The method of claim 1 wherein applying the execution license to the control system content to generate the protected content comprises applying the production limits that prevent execution of the control system content after the number of products that the control system content can be used to produce has been met.

4. The method of claim 1 wherein the process-related constraints of the execution license comprise performance limits that restrict a level of performance at which the control system content can be used to operate the machine system, and wherein applying the execution license to the control system content to generate the protected content comprises applying the performance limits that prevent execution of the control system content to operate the machine system at a higher level of performance than the level of performance at which the control system content can be used to operate the machine system.

5. One or more non-transitory computer-readable storage media, in an industrial automation environment, having program instructions stored thereon to facilitate protection of control system content used in the industrial automation environment, wherein the program instructions, when executed by a computing system, direct the computing system to at least:
receive, by the one or more processors, the control system content for use in the industrial automation environment, wherein the control system content comprises controller program code that one or more industrial controllers to each drive one or more corresponding machine systems;
receive, by the one or more processors, content protection instructions for the control system content, wherein the content protection instructions comprise restrictions on execution of the control system content;
generate, via the one or more processors, an execution license that includes process-related constraints for the control system content based on the content protection instructions, wherein the process-related constraints of the execution license comprise controller limits that restrict a total number of controllers on which the control system content may be run;
apply the execution license to the control system content to generate protected content, wherein use of the control system content is granted subject to the process-related constraints of the execution license; and
produce a number of products via execution of the protected content by the one or more industrial controllers to drive the one or more corresponding machine systems, wherein a total number of industrial controllers of the one or more industrial controllers executing the control system content is limited by the total number of controllers specified by the process-related constraints.

6. The one or more non-transitory computer-readable storage media of claim 5 wherein the program instructions direct the computing system to apply the execution license to the control system content to generate the protected content by directing the computing system to apply the controller limits that prevent execution of the control system content on more controllers than the number of controllers on which the control system content may be run.

7. The one or more non-transitory computer-readable storage media of claim 5 wherein the process-related constraints of the execution license comprise production limits that restrict a number of products that the control system content can be used to produce, and wherein the program instructions direct the computing system to apply the execution license to the control system content to generate the protected content by directing the computing system to apply the production limits that prevent execution of the control system content after the number of products that the control system content can be used to produce has been met.

8. The one or more non-transitory computer-readable storage media of claim 5 wherein the process-related constraints of the execution license comprise performance limits that restrict a level of performance at which the control system content can be used to operate the machine system, and wherein the program instructions direct the computing system to apply the execution license to the control system content to generate the protected content by directing the computing system to apply the performance limits that prevent execution of the control system content to operate the machine system at a higher level of performance than the level of performance at which the control system content can be used to operate the machine system.

9. An apparatus, in an industrial automation environment, to facilitate protection of control system content used in the industrial automation environment, the apparatus comprising:
one or more computer-readable storage media; and
program instructions stored on the one or more computer-readable storage media that, when executed by a processing system, direct the processing system to at least:
receive, by the one or more processors, the control system content for use in the industrial automation environment, wherein the control system content comprises controller program code that directs an industrial controller to drive a machine system;
receive, by the one or more processors, content protection instructions for the control system content, wherein the content protection instructions comprise restrictions on execution of the control system content;
generate, via the one or more processors, an execution license that includes process-related constraints for the control system content based on the content protection instructions, wherein the process-related constraints of the execution license comprise performance limits that restrict a level of performance at which the control system content can be used to operate the machine system;
apply the execution license to the control system content to generate protected content; and
produce a number of products via execution of the protected content by the industrial controller to drive the machine system, wherein production of the number of products is restricted to the level of performance specified by the process-related constraints.

10. The apparatus of claim 9 wherein the program instructions direct the processing system to apply the execution license to the control system content to generate the protected content by directing the processing system to apply the performance limits that prevent execution of the control system content to operate the industrial automation device at a higher level of performance than the level of performance at which the control system content can be used to operate the industrial automation device.

* * * * *